UNITED STATES PATENT OFFICE.

CURT GENTSCH, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

NEW RESIN-LIKE PRODUCT.

No. 924,449.　　　　Specification of Letters Patent.　　　　Patented June 8, 1909.

Application filed February 26, 1908. Serial No. 417,901.

*To all whom it may concern:*

Be it known that I, CURT GENTSCH, doctor of philosophy, chemist, citizen of the German Empire, residing at Vohwinkel, near Elberfeld, Kingdom of Prussia, Germany, have invented new and useful Improvements in New Resin-Like Products, of which the following is a specification.

My invention relates to the manufacture and production of a new resin like product which is obtained by treating with acids: mixtures of ortho-cresol and formaldehyde or mixtures of ortho-cresol and compounds capable of forming formaldehyde under these conditions. The acid reacts as a condensing agent. The new condensation compound has neither the corrosive qualities of ortho-cresol nor its unpleasant smell nor the unpleasant odor of the formaldehyde condensation products with crude cresol. It resembles hard transparent resins and may be used as a commercial substitute for shellac.

In carrying out my invention practically I can proceed as follows, the parts being by weight: 5 parts of concentrated hydrochloric acid are added to a mixture of 100 parts of ortho-cresol with 70 parts of a 40 per cent. formaldehyde solution and 60 parts of water. The mixture while being stirred is heated to about 100° C. for several hours. The product thus obtained is then purified by a thorough washing with water or by a prolonged treatment with steam.

The new product is a straw-yellow to light brown resin soluble in dilute alkalies, easily soluble in methyl alcohol, ethyl alcohol, acetone, carbon disulfid, acetylene tetrachlorid and chloroform. It is scarcely soluble in benzene, dichlorhydrin, carbon tetrachlorid and terpineol and is insoluble in oil of turpentine, fatty oils, such as linseed oil and acids. When heated to above 90° C. it softens and it melts at about from 110–120° C. It furnishes a well drying brilliant and odorless coating on being used as a varnish or polish for wood, iron etc.

Having described my invention and in what manner the same is to be performed what I claim as new and desire to secure by Letters Patent is:—

The herein-described new resin like product, which can be obtained by treating with acids, mixtures of ortho-cresol and formaldehyde, which product is a straw-yellow to light brown resin, soluble in dilute alkalies, easily soluble in methyl alcohol, ethyl alcohol, acetone, carbon disulfid, acetylene tetrachlorid and chloroform, scarcely soluble in benzene, dichlorohydrin, carbon tetrachlorid and terpineol and insoluble in oil of turpentine and linseed oil; softening when heated to above 90° C. and melting at about from 110–120° C. and furnishing a well drying brilliant and odorless coating on being used as a varnish or polish, substantially as described.

In testimony whereof I have hereunto set my hand in the presence of two subscribing witnesses.

CURT GENTSCH. [L. S.]

Witnesses:
　OTTO KÖNIG,
　WM. WASHINGTON BRUNSWICK.